US012652554B2

(12) United States Patent
Yang et al.

(10) Patent No.: US 12,652,554 B2
(45) Date of Patent: Jun. 9, 2026

(54) METHOD, SYSTEM AND USER DEVICE FOR OPTIMIZING INDOOR WIRELESS COVERAGE

(71) Applicant: TELEFONICA INNOVACION DIGITAL SL, Madrid (ES)

(72) Inventors: Xiaoyuan Yang, Madrid (ES); Abraham Diaz Nuñez, Madrid (ES); Lars Stalling, Madrid (ES)

(73) Assignee: TELEFONICA INNOVACION DIGITAL SL, Madrid (ES)

( * ) Notice: Subject to any disclaimer, the term of this patent is extended or adjusted under 35 U.S.C. 154(b) by 211 days.

(21) Appl. No.: 18/505,572

(22) Filed: Nov. 9, 2023

(65) Prior Publication Data

US 2024/0163693 A1     May 16, 2024

(30) Foreign Application Priority Data

Nov. 10, 2022     (EP) .................................... 22383081

(51) Int. Cl.
    *H04W 24/02*        (2009.01)
    *H04W 16/26*        (2009.01)
    *H04W 84/12*        (2009.01)
(52) U.S. Cl.
    CPC ........... *H04W 24/02* (2013.01); *H04W 16/26* (2013.01); *H04W 84/12* (2013.01)
(58) Field of Classification Search
    CPC ..... H04W 24/02; H04W 16/26; H04W 84/12; H04W 4/029; H04W 4/33; H04W 16/20; H04B 17/26; H04B 17/318
    See application file for complete search history.

(56) References Cited

U.S. PATENT DOCUMENTS 10,756,818 B2 *  8/2020  Vardarajan ......... H04B 10/2939
11,423,584 B2    8/2022  Mantri et al.
2012/0229341 A1 * 9/2012  Hwang ..................... G01S 5/06
                                                342/451

(Continued)

FOREIGN PATENT DOCUMENTS

WO        2017/024077 A1     2/2017

OTHER PUBLICATIONS

Extended European Search Report for 22383081.1, dated Apr. 25, 2023.

*Primary Examiner* — Noel R Beharry
*Assistant Examiner* — Phillip J Kearns
(74) *Attorney, Agent, or Firm* — Sughrue Mion, PLLC

(57)        ABSTRACT

A method and system for optimizing indoor wireless coverage are proposed. A user device and computer program are also proposed. The method comprises connecting, by a mobile device, to a wireless router via a first wireless network, the wireless router being located at a customer premises; computing a coverage metric for a plurality of subpoints within at least a first point and a second point of the customer premises, obtaining a plurality of coverage metrics as a result, each coverage metric comprising a position of the mobile device and a quality indicator of the wireless connection of the mobile device in that position; generating a wireless coverage map using the plurality of coverage metrics; determining whether a wireless signal repeater has to be installed based on the generated wireless coverage map; and showing a new wireless coverage map considering the installation of the wireless signal repeater.

13 Claims, 5 Drawing Sheets

(56) References Cited

U.S. PATENT DOCUMENTS

| 2015/0237164 A1* | 8/2015 | Mohammad Mirzaei | ................... |
| | | | H04W 4/33 |
| | | | 709/203 |
| 2018/0192316 A1* | 7/2018 | Lin | ........................ H04W 24/10 |
| 2018/0317095 A1* | 11/2018 | Rumler | ................. H04W 16/20 |
| 2019/0150002 A1* | 5/2019 | Ligata | ..................... H04B 3/54 |
| | | | 370/329 |
| 2020/0413265 A1* | 12/2020 | Dabrowski | ........... H04W 16/18 |
| 2022/0108532 A1* | 4/2022 | Denneler | ............. H04W 4/029 |

* cited by examiner

METHOD, SYSTEM AND USER DEVICE FOR OPTIMIZING INDOOR WIRELESS COVERAGE

TECHNICAL FIELD

The present invention relates to a method and to a system for optimizing indoor wireless coverage. The invention also relates to a user device, and to computer programs, for optimizing indoor wireless coverage.

BACKGROUND OF THE INVENTION

Nowadays, WIFI technology is present in anyone's home. It provides the last mile high-capacity indoor broadband connectivity that links fiber network with end-user's devices, such as smartphones or laptops. Optimizing WIFI at home is essential to provide good connectivity experiences. It's well known that the most connectivity problems in a fiber connected house is caused by WIFI related issues. Considering that the >90% of daily traffic passes through the home WIFI, it is extremely important to optimize WIFI connectivity at home to achieve a good end-to-end user experience.

There are multiple WIFI issues. The most relevant ones include a) WIFI saturation due to demand, b) interference with neighboring WIFIs, and c) bad coverage in certain areas of the indoor area.

WIFI saturation can be potentially mitigated by traffic prioritization where network packets of certain application (such as video conferencing o gaming) are tagged using a specific IP header field. WIFI chipset checks the value of the IP header and schedules the packet using different queues. Different WIFI medium access parameters, such as retry time, are configured in each queue so that packets in the queue with higher priority have higher chance to be delivered. Furthermore, the new Wifi-6 standard can also reduce the impact of WIFI saturation using resource allocation.

Likewise, WIFI standard bodies have been very active in proposing different solutions to overcome WIFI interference. For instance, the usage of 5 GHz can reduce interferences due to the lower radio propagation capability. Other techniques such as dynamic channel switching can also mitigate interferences.

WIFI coverage, however, is currently the most important unsolved WIFI issue. There are different available solutions based on WIFI mesh or WIFI extender (also called WIFI repeater). The main difference is that WIFI mesh is a multi-hop solution, whereas WIFI extender is only one-hop. Multi-hop WIFI mesh solution is required when coverage to big areas, such as a gym, needs to be provided. To apply effectivity WIFI-mesh or WIFI extender, there are several key questions that should be answered:

1. Does the end-user really need a WIFI signal extender?
2. How many extenders/repeaters does a customer need?
3. Where should the repeater be placed at home?

The answer to such questions requires a detailed existing WIFI coverage map where signal strength is measured in each point of the indoor area. Such measurement could be very time consuming and requires a specialized technician.

Besides the above, Virtual Reality (VR) and Augmented Reality (AR) technology (known as XR) has been quickly adopted for different applications. Devices such as Oculus from Facebook is pushing down the cost of VR devices. AR technology, on the other hand, has been quickly adopted in consumer smartphone devices. Nearly all new smartphones come with multiple sensors, such as a gyroscope, magnetometer, accelerometer, and a camera. Sensors are combined with a software layer to provide an easy-to-use AR framework for new applications.

There are known some patent and patent applications in this field.

For instance, in US20220108532A1, AR capabilities are used to represent WIFI signal in the form of a colored path. This proposed solution relies on the capability of the end-user device that is capable to compute the coordinate and WIFI strength. Such system can help end-users to visualize the coverage of WIFI signal at the home.

Another example is disclosed in U.S. Pat. No. 11,423, 584B2, which applies the same AR capabilities of the US20220108532A1 to determine the device position, and also relies on the device to measure WIFI signal strength in form of RSSI. The object is, however, to determine a new position for the WIFI router so to maximize the received signal of a list of interesting points determined by the end-user.

Compared with the previous solutions, present invention uses same AR capabilities to determine the device position. In fact, present invention strongly relies on existing AR frameworks, provided by new smartphones. For instance, the present invention can use existing AR APIs from ARKit and ARCore, included in Android and iOS systems, to represent WIFI signal strength information in the device's viewport.

Nevertheless, the present invention improves the way the coverage map is created. U.S. Pat. No. 11,423,584B2 only uses distance between interesting points and router as the main parameter to compute the new coverage map when the router is moved. In contrast, present invention measures constantly while end-user is working around. This allows building a more accurate coverage map. For instance, WIFI signal degradation may change from one room to another because the thickness of the wall. Present invention will be able to detect this fact.

Moreover, present invention can recommend the end-user to introduce a new WIFI signal extender. Present invention does not simulate how coverage map changes when end-user moves the router as proposed by U.S. Pat. No. 11,423, 584B2. The new WIFI extender does not change coverage map of existing router that remain static. In contrast, it provides a better coverage by migrating user devices to another radio. In more pragmatical term, moving router is not always possible because the WAN fiber connection (connected in the router) could not be easily moved from one place to another. Present invention allow the end-user to solve the coverage problem without requiring new wiring.

Likewise, both US20220108532A1 and U.S. Pat. No. 11,423,584B2 rely on user-devices to measure WIFI signal strength. Because of security reasons, application on consumer devices with iOS are not able to read RSSI values for OS.

DESCRIPTION OF THE INVENTION

Present invention proposes, according to one aspect, a method for optimizing indoor wireless coverage. The method comprises connecting, by a mobile device, to a wireless router via a first wireless network, the wireless router being located at a customer premises; computing, by the mobile device, a coverage metric for a plurality of subpoints within at least a first point and a second point of the customer premises, obtaining a plurality of coverage metrics as a result, the first point referring to an initial point where the wireless router is located and the second point referring to a point where the customer wants to know if wireless coverage is enough, the coverage metrics being computed in real time while the mobile device is moved from the first point to the second point, and each coverage metric comprising a position of the mobile device and a quality indicator of the wireless connection of the mobile device in that position, the quality indicator being computed by the wireless router; generating, by the mobile device, a wireless coverage map using the plurality of coverage metrics; determining, by the mobile device, whether a wireless signal repeater has to be installed based on the generated wireless coverage map; and showing, by the mobile device, a new wireless coverage map considering the installation of the wireless signal repeater.

In an embodiment, the determining step comprises establishing that the wireless signal repeater is to be installed. In this case, the mobile device further comprises computing where to place the wireless signal repeater by means of: determining which ones of the plurality of subpoints are repeater candidates based on the quality indicator at each subpoint, wherein a subpoint is determined as repeater candidate if its quality indicator is within a minimum and maximum range; identifying the determined repeater candidates having a quality indicator lower or equal than a given threshold as bad samples; computing a performance parameter for each repeater candidate; and selecting the repeater candidate having the lowest performance parameter.

In an embodiment, the wireless router is operatively connected to a cloud computing system via a second wireless network, and the mobile device receives the computed quality indicator from the wireless router via the cloud computing system.

Particularly, in some embodiments, the position of the mobile device is computed using an Augmented Reality framework of the mobile device.

In some embodiments, the coverage metrics are computed every 400-600 milliseconds.

In some embodiments, the computing step further comprises establishing an augmented reality virtual path between the first point and the second point by creating virtual objects within said first point and second point and by assigning a color to each created virtual object depending on a level of the quality indicator.

In some embodiments, the generating step further comprises improving the generated wireless coverage map by considering the entire customer premises by means of: computing an averaged quality indicator of the wireless connection of the mobile device for each radial distance of the customer premises; computing a linear approximation equation that approximates a quality indicator-distance relationship to a straight line; filling gaps of the customer premises in which the mobile device has not been moved by iterating through all the coverages metrics and by computing the quality indicator depending on if there is a quality indicator available or not for each subpoint, wherein if the subpoint comprises a quality indicator a value thereof is filtered using the averaged quality indicator at its radial distance, and wherein if the subpoint comprises no quality indicator a quality indicator is interpolated considering propagation and neighborhood factors; and smoothing the coverage map by interpolating each subpoint with the quality indicators of its neighboring subpoints.

In some embodiments, the method also provides a name to the second point.

Present invention also proposes, according to another aspect, a system for optimizing indoor wireless coverage, comprising a wireless router located at a customer premises and a mobile device configured to connect to the wireless router. The mobile device being configured to: compute a coverage metric for a plurality of subpoints within at least a first point and a second point of the customer premises, obtaining a plurality of coverage metrics as a result, the first point referring to an initial point where the wireless router is located and the second point referring to a point where the customer wants to know if wireless coverage is enough, the coverage metrics being computed in real time while the mobile device is moved from the first point to the second point, and each coverage metric comprising a position of the mobile device and a quality indicator of the wireless connection of the mobile device in that position computed by the wireless router; generate a wireless coverage map using the plurality of coverage metrics; determine whether a wireless signal repeater has to be installed based on the generated wireless coverage map; and show a new wireless coverage map considering the installation of the wireless signal repeater.

In yet another aspect, present invention proposes a user device (or mobile device) comprising one or more processors configured to compute a coverage metric for a plurality of subpoints within at least a first point and a second point of a customer premises, obtaining a plurality of coverage metrics as a result, the first point referring to an initial point and the second point referring to a point where the customer wants to know if wireless coverage is enough, the coverage metrics being computed in real time while the user device is moved from the first point to the second point, and each coverage metric comprising a position of the user device and a quality indicator of the wireless connection of the user device in that position; generate a wireless coverage map using the plurality of coverage metrics; determine whether a wireless signal repeater has to be installed based on the generated wireless coverage map; and show a new wireless coverage map considering the installation of the wireless signal repeater.

Other embodiments of the invention that are disclosed herein also include software programs to perform the method embodiment steps and operations summarized above and disclosed in detail below. More particularly, a computer program product is one embodiment that has a computer-readable medium including computer program instructions encoded thereon that when executed on at least one processor in a computer system causes the processor to perform the operations indicated herein as embodiments of the invention.

Present invention thus provides an easy-to-use solution to help end-users/customers to analyse the current WIFI coverage of an indoor area/place, such as the users/customers home, and, if necessary, make concrete recommendations for improvements. Present invention provides a highly visual way to help customers to understand the space and how the concrete home features (distances, distribution, walls) affect the WIFI coverage. Moreover, it helps users to take measurements at the indoor area in a simple, pleasurable, and entertaining way, and avoids users to perform measurements in entire indoor area/place. Furthermore, it provides direct and understandable solution for coverage problem.

BRIEF DESCRIPTION OF THE DRAWINGS

The previous and other advantages and features will be more fully understood from the following detailed description of embodiments, with reference to the attached figures, which must be considered in an illustrative and non-limiting manner, in which.

DETAILED DESCRIPTION OF THE INVENTION AND OF PREFERRED EMBODIMENTS

Figure 1:
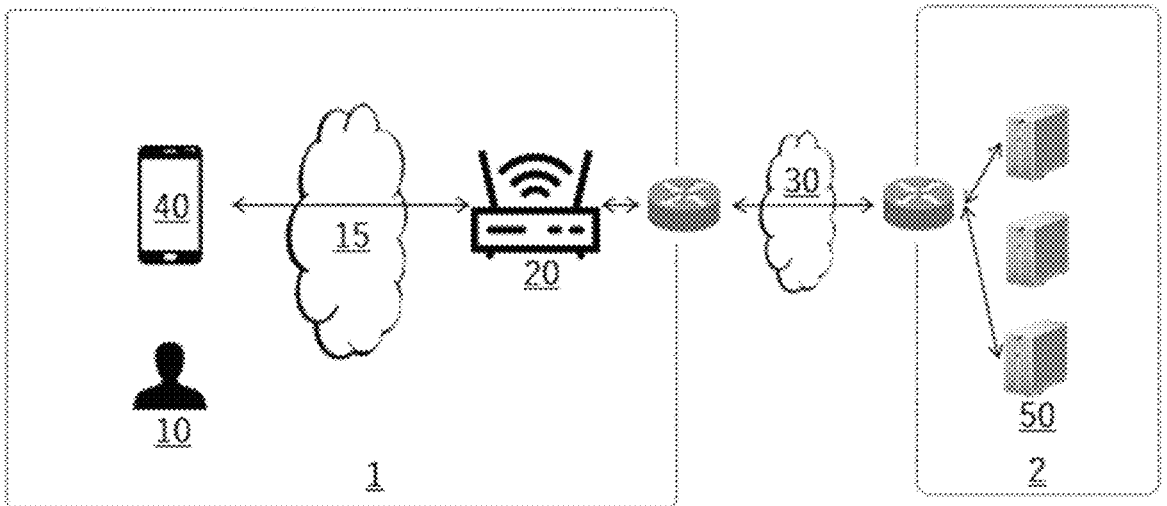
FIG. 1 schematically illustrates a system for optimizing indoor wireless coverage, according to an embodiment of the present invention.

FIG. 1 shows an embodiment of the proposed system. In this embodiment, the system comprises a wireless router 20 that is connectable to a backend system 50 at a cloud infrastructure 2 through Internet 30 (or second wireless network). The system also includes a mobile device 40 such as a smartphone or a tablet, among others, of a customer/user 10 participating in the wireless optimization process. The mobile device 40, which is located at a customer premises 1 (e.g. the customer's home, or another indoor area/place) is connected to a WIFI network (or first wireless network) 15 provided by the wireless router 20.

According to the invention, the signal strength of the wireless/WIFI connection is normally measured by computing a quality indicator of the WIFI connection, for example the received signal strength indication (RSSI).

RSSI is automatically computed by the WIFI chipset, and it is used to drive different WIFI operations, such as when a device decides to disconnect from one Access Point (AP) and connect to another. RSSI is a sensitive information because it can be used to infer location information of all neighboring devices. Designer of some consumer devices, such as iPhone, decided to not make RSSI accessible by applications. Only certain applications with specific certification can access RSSI measurements from iOS.

Particularly, in the present invention, the wireless router 20 computes the quality indicator/RSSI of the mobile device 40 that participates in the optimization. A demon process is always running in the wireless router 20. The optimization application can interact with the demon and ask to activate real time RSSI measurement. When it is activated, RSSI of the mobile device 40 is computed every certain period of time (e.g. every 400-600 milliseconds) and propagated to cloud computing system 50. An optimization application or APP installed in the mobile device 40 can then consume the RSSI measurements by retrieving them from cloud computing system 50. Authentication and authorization mechanisms are on place to ensure that only the authorized optimization application is entitled to ask the RSSI measurements. Alternatively, in some embodiments, the optimization application can access the quality indicator/RSSI directly from the device's OS, instead of interacting with the cloud computing system 50.

To perform the recommendations and optimizations, present invention generates a wireless coverage map using several coverage metrics. Each coverage metric is composed of the following values: X, Y position and RSSI value in that position. The resulting coverage map is a grid within each square represents a 1×1 meters area. The origin of coordinates is the place where the wireless router 20 is located.

When customer 10 walks around the customer premises 1, the mobile device 40 computes constantly the X, Y and RSSI value (for example, by interacting with cloud computing system 50) and initiates the coverage map. As a result, an initial wireless coverage map is created with gaps in those coordinates where the customer 10 didn't pass through.

In some embodiments, the initial wireless coverage map can be improved by generating an overall coverage map of the entire customer premises 1 (i.e. of the entire house or indoor area/place) by filling the missing gaps. To do so, in an embodiment, the following procedure is proposed:

Averaged RSSI by radial distance calculation: For each radial distance, the averaged RSSI is computed. To do that, given certain radial distance, the RSSI of all samples at this distance are summed and divided by the number of samples.

$$\overline{RSSI}_d = \frac{\sum_{i=1}^{N} RSSI_i}{N}$$

where:

$\overline{RSSI}_d$ is the averaged RSSI for radial distance d.

$RSSI_i$ is the RSSI of the ith sample.

N is the number of samples.

d is the radial distance.

Since the wireless router 20 is in the origin of coordinates and its propagation diagram is spherical, the averaged RSSI by radial distance is a very useful data.

In this formulation, it is assumed that the propagation model is spherical in 2D. If the wireless router 20 has another propagation shape, the formulation should be changed.

The idea is considering the average of all measured samples where RSSI values are equal to the missing gap, according to the propagation model, as the missing RSSI value.

It may be possible that there is no data available for a specific radial distance. In this case, a linear interpolation between the two nearest radial distances with valid data will be computed.

$$\overline{RSSI}(d) = \overline{RSSI}_{d1} + \frac{\overline{RSSI}_{d2} - \overline{RSSI}_{d1}}{d2 - d1}(d - d1)$$

where:

$\overline{RSSI}(d)$ is the averaged RSSI at distance d.

d is the radial distance for which the RSSI wants to be computed.

d1 and d2 are the two radial distances closest to d and with valid RSSI data.

$\overline{RSSI}_{d1}$ and $\overline{RSSI}_{d2}$ are the RSSI at d1 and d2 radial distances Linear approximation equation calculation: The equation which approximates the RSSI-distance relationship to a straight line is calculated. The two points used to compute this equation are: d1: The origin of coordinates, that is d=0. The RSSI is the one measured next to the wireless router 20, and d2: The radial distance which is closest to the $d_{MAX}/2$ distance and whose measured mean RSSI is different from 0.

The equation looks like:

$$\overline{RSSI}(d) = \overline{RSSI}_0 + \frac{\overline{RSSI}_{d2} - \overline{RSSI}_0}{d2} d$$

where:

$\overline{RSSI}(d)$ is the averaged RSSI at distance d.

d is the radial distance for which the RSSI wants to be computed.

d2 is the closest value to $d_{MAX}/2$ whose measured mean RSSI is different from 0.

$\overline{RSSI}_0$ is the RSSI at distance 0.

$\overline{RSSI}_{d2}$ is the RSSI at distance d2.

Filling the gaps: The algorithm iterates through all samples and computes their RSSI depending on if there is RSSI measure available or not for each point. The following scenarios could be possible:

RSSI has been measured: In this case, a valid RSSI value has been registered for this point. To smooth the resulting coverage map, its value is filtered using the averaged RSSI at its radial distance as follows:

$$\widetilde{RSSI}_{x,y} = \alpha \overline{RSSI}_d + (1-\alpha) RSSI_{x,y}$$

where:

$\widetilde{RSSI}_{x,y}$ is the final RSSI value at (x, y) coordinate.

$\overline{RSSI}_d$ is the averaged RSSI value at $d = \sqrt{x^2 + y^2}$.

$RSSI_{x,y}$ is the measured RSSI at (x, y) coordinate.

$\alpha$ is the filter coefficient. A value of 0.2 has been chosen.

RSSI has not been measured: In this case, the algorithm has no RSSI value for this coordinate, so it must estimate a reasonable value considering propagation and neighborhood factors.

In first place, the algorithm tries to get an interpolated value from its neighbors' points. Given the point (x, y), the next x and y bounds will be used:

$$x_{start} = MAX(x_{min}, x-1)$$

$$x_{end} = MIN(x_{max}, x+1)$$

$$y_{start} = MAX(y_{min}, y-1)$$

$$y_{end} = MIN(y_{max}, y+1)$$

where:

$x_{min}$, $x_{max}$, $y_{min}$ $y_{max}$ are the maps maximum and minimum coordinates.

$x_{start}$, $x_{end}$, $y_{start}$ $y_{end}$ are the bounds used to compute the interpolation.

In this way, for each point the method could take up to 9 points to compute the interpolation, 8 neighbors and the point itself. For extreme points, i.e., $[x_{min}, y_{max}]$ only 3 points are available.

The interpolation calculation is simple: the RSSI mean of all points inside the neighborhood bounds.

$$\widetilde{RSSI}_{x,y} = \frac{\sum_{n=1}^{N} RSSI_n}{N}$$

where:

$\widetilde{RSSI}_{x,y}$ is the final RSSI value at (x, y) coordinate.

$RSSI_n$ is the measured RSSI at neighbor n.

N is the number of samples, neighbors+the sample itself.

The interpolation value can be:

Different from zero. In this case, the resulting value is used as RSSI value for this (x, y) coordinate.

Zero. The point and its neighbors have no RSSI data. The averaged RSSI value at its radial distance will be used.

In a nutshell, the RSSI for a (x, y) point can be computed as follows:

Filtered RSSI if RSSI has been measured at (x, y) coordinate.

Interpolated RSSI if RSSI has not been measured and neighbor data is available.

Averaged RSSI at its radial distance if RSSI has not been measured and neighbor data is not available.

Coverage map smoothing: After the previous steps, the RSSI is available for all the points in the coverage map. However, it is possible to find some atypical values, that is very different RSSI values along adjacent points. This step will clear these atypical values applying a smoothing process. In an embodiment, this process consists of interpolating each point with its neighbors' RSSI, as shown in the previous step. Keep in mind that the interpolation will use the RSSI values computed in the previous step and not the already neighbors' smoothed values.

$$\widetilde{SRSSI}_{x,y} = \frac{\sum_{n=1}^{N} \widetilde{RSSI}_n}{N}$$

where:

$\widetilde{SRSSI}_{x,y}$ is the smoothed RSSI value at (x, y) coordinate.

$\widetilde{RSSI}_n$ is the computed RSSI value at neighbor n.

N is the number of samples, neighbors+the sample itself.

Now, for each (x, y) point the algorithm stores two values:

$\widetilde{RSSI}_{x,y}$ is the RSSI measured or estimated.

$\widetilde{SRSSI}_{x,y}$ is the smoothed RSSI.

Once the (initial or improved) coverage map is generated, the next goal is to improve the wireless signal in the customer premises 1 by placing signal repeaters. Specifically, the present invention determines if a wireless signal repeater is needed. Furthermore, the present invention can determine where the wireless signal repeater should be placed. To do so, the first thing to do is getting all the coordinates where a wireless signal repeater could be placed. A (x, y) point is a repeater candidate if and only if:

$$\widetilde{SRSSI}_{x,y} \in [RepMinRSSI, RepMaxRSSI]$$

where:

$\widetilde{SRSSI}_{x,y}$ is the smoothed RSSI value at (x, y) coordinate.

RepMinRSSI is the minimum acceptable RSSI for the repeater. Typically, −73 dBm.

RepMaxRSSI is the maximum acceptable RSSI for the repeater. Typically, −67 dBm.

Then, the method identifies the bad samples which have a low RSSI. Typically, a sample is a bad one if its RSSI is lower than or equal to −65 dBm.

With repeater candidates and bad samples, the method computes what repeater candidates is the most appropriate. This is the point which minimizes the distance from all bad samples. So, first a performance parameter (termed badness in the following) of each repeater candidate is computed as follows:

$$\text{Badness}\,(c_x, c_y) = \sum_{i=1}^{B} \sqrt{\left(c_x - b_{x_i}\right)^2 + \left(c_y - b_{y_i}\right)^2}$$

where:

$(c_x, c_y)$ are the coordinates of the repeater candidate

Badness$(c_x, c_y)$ is the badness of the repeater candidate $(c_x, c_y)$.

$(b_{x_i}, b_{y_i})$ are the coordinates of the ith bad sample.

B is the number of bad samples.

Then, the method chooses the repeater candidate with the lowest badness. In this way, the suggested point meets the following conditions: It is placed in the nearest point from all bad samples, and since it is a repeater candidate, its RSSI are into the bounds [RepMinRSSI, RepMaxRSSI].

Once the repeater location has been computed, the method can further simulate how the coverage map would be in case a wireless signal repeater is set up at the suggested location. For each point, three possible RSSI values are computed: theoretical, experimental, and linear approximated RSSI.

Theoretical RSSI: This value can be obtained from the Friis free space loss equation.

$$TheoRepRSSI_{rx} =$$

$$P_{tx} + G_{tx} + G_{rx} - 20\log_{10}(d) - 20\log_{10}(f) - 20\log_{10}\left(\frac{4p}{c}\right)$$

where:

$TheoRepRSSI_{rx}$ is the received RSSI in dBm $P_{tx}$ is the repeater transmission power in dBm d is the distance in meters.

f is the frequency in Hz.

c is the speed of light in m/s.

$G_{tx}$ is the antenna transmission gain in dBi $G_{rx}$ is the antenna reception gain in dBi The method can use the following values as a reference:

| Parameter | Value |
|---|---|
| $P_{tx}$ | −30 dBm |
| f | 5 GHz |
| $G_{tx}$ | 23 dBi |
| $G_{rx}$ | 23 dBi |

Experimental RSSI: This value can be computed as follows:

$$ExpRSSI_{x,y} = P_{tx} - |\widehat{SRSSI}_{Rep_x, Rep_y} - \widehat{SRSSI}_{x,y}|$$

where:

$ExpRSSI_{x,y}$ is the experimental RSSI at (x, y) in dBm.

$P_{tx}$ is the repeater transmission power in dBm.

$\widehat{SRSSI}_{Rep_x, Rep_y}$ is the smoothed RSSI at the point $(Rep_x, Rep_y)$, where the repeater is placed.

$\widehat{SRSSI}_{x,y}$ is the smoothed RSSI at (x, y) point.

In an embodiment, a −30 dBm value is used as repeater transmission power $P_{tx}$.

Linear approximated RSSI: The linear approximated RSSI, $LARepRSSI_{x,y}$, can be computed using the previous equation $$\overline{RSSI}(d) = \overline{RSSI}_0 + \frac{\overline{RSSI}_{d2} - \overline{RSSI}_0}{d2} d.$$

The distance is the one between the repeater and the sample point.

Once the three RSSI values have been computed, the method can choose the worst case, that is, the minimum of these values. In this way, the final wireless signal repeater value is:

$$RepRSSI_{x,y} = \min(TheoRepRSSI_{rx}, ExpRepRSSI_{x,y}, LARepRSSI_{x,y})$$

Once all the previous steps have been completed, for each point the method selects the transmission source, router or wireless signal repeater, with the highest RSSI value. Notice that present invention assumes that a roaming mechanism is available and is able to connect devices to the best AP (router or repeater).

Figure 2:
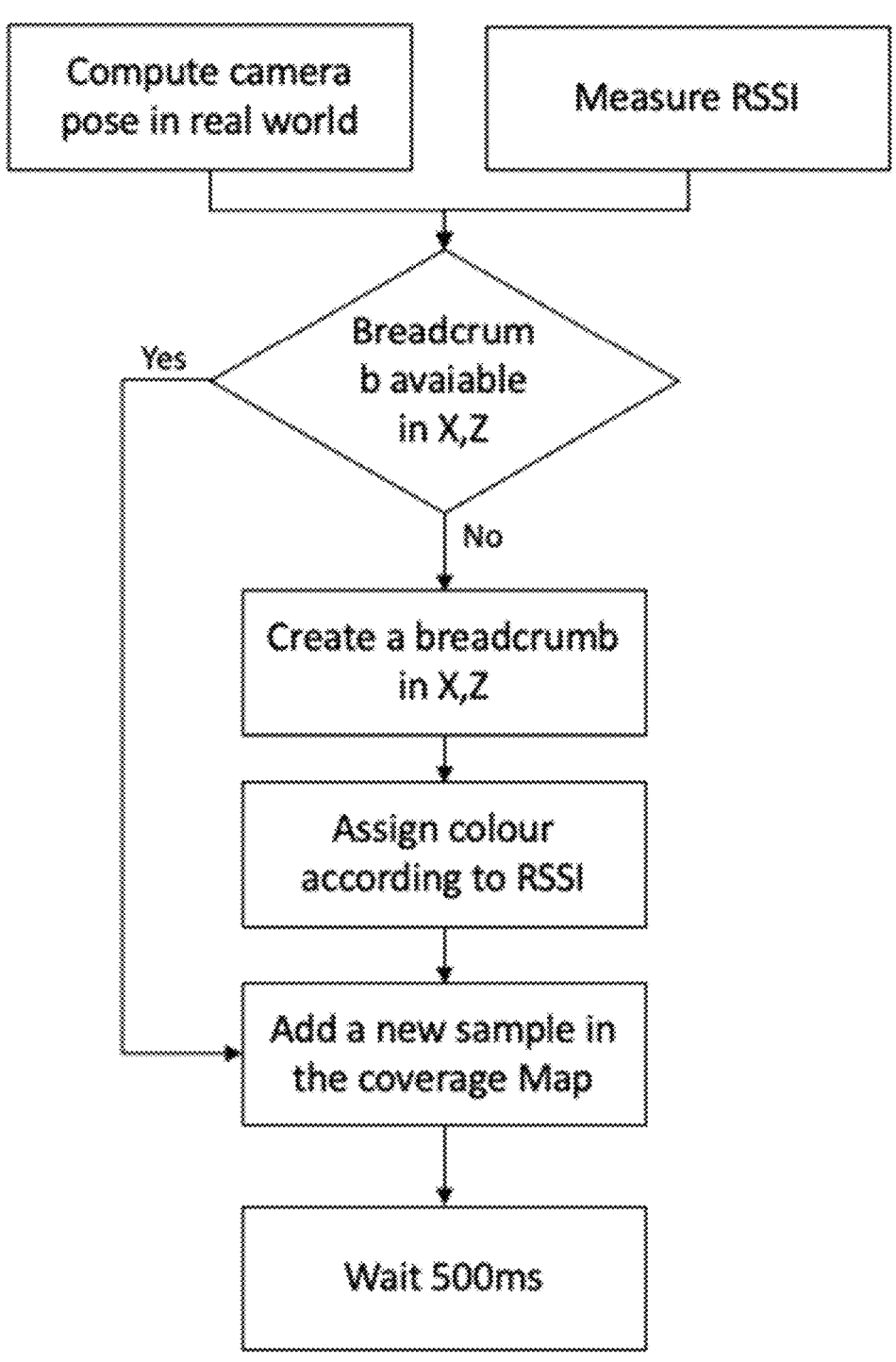
FIG. 2 is a flow diagram showing a method for optimizing indoor wireless coverage, according to an embodiment of the present invention.

With reference now to FIG. 2, therein an embodiment on how the coverage metrics are calculated is shown. Particularly, present invention uses mobile device's AR capability to estimate location position. For example, in this embodiment, the invention uses pose of the camera of the mobile device 40 in world space, that is computed by the mobile device 40 per frame basis. Depending on the AR framework, the computed pose is in form of X, Y and Z, where Z is in the direction the camera is looking. Particularly, the present invention takes X and Z as the position estimation of the mobile device 40 in the real world.

As customer 10 walks around the customer premises 1, virtual objects, called breadcrumbs, can be also created. For instance, for each 1 m×1 m square, a virtual object is created. All virtual objects together create the path where customer 10 has passed through. In parallel, the RSSI is also estimated. Particularly, in this embodiment, the RSSI is computed every 500 milliseconds. The computed RSSI can be used to determine the color of each virtual object that has been created. For example, by using green when RSSI is good, orange when it is acceptable and red when RSSI is bad.

Figure 3:
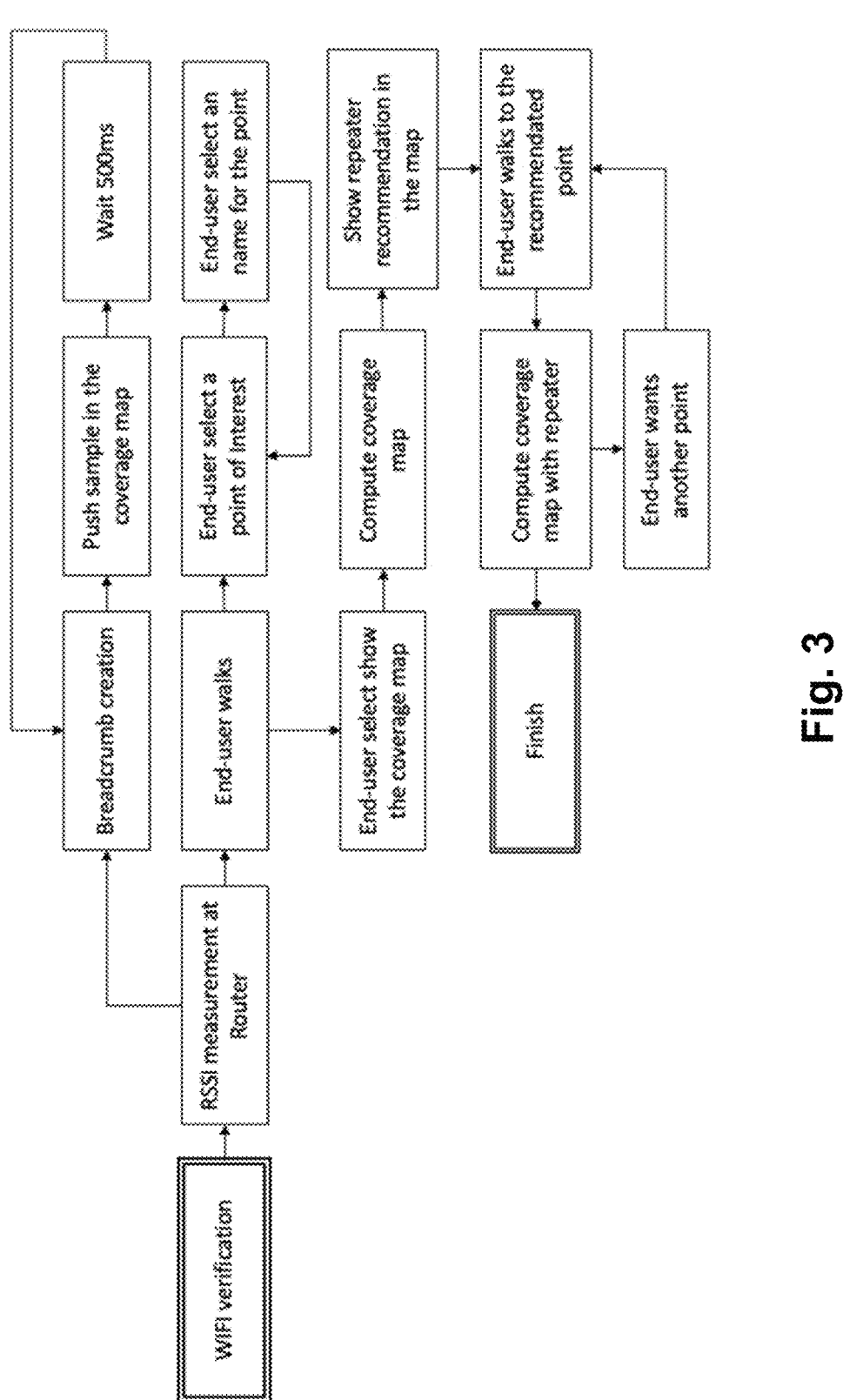
FIG. 3 is a flow diagram showing another embodiment of the proposed method.

FIG. 3 illustrates another embodiment of the proposed method. In this case, the method starts by verifying that the WIFI connection is appropriate to make sure that the mobile device 40 is connected to the first wireless network 15 the customer 10 wants to optimize. One implementation is the scanning of a QR code that normally comes in the wireless router 20 with all information related with WIFI (SSID and password).

Once validated, the mobile device 40 (via the optimization application) performs first quality indicator/RSSI measurement at wireless router 20 and starts the AR framework to compute camera position in real world. It starts two parallel processes. First, it measures RSSI every certain period of time (for example, every 500 milliseconds as stated before) and creates virtual object in the AR layer. The measured RSSI and estimated camera position are pushed as sample in the wireless coverage map. Second, customer 10 is invited to walk to a different interesting point(s). Interesting point(s) could be different living instances or places of the customer premises 1 where the customer 10 wants to have good WIFI coverage. In some embodiments, the customer 10 is also invited to select a name for the interesting point(s).

Figure 5:
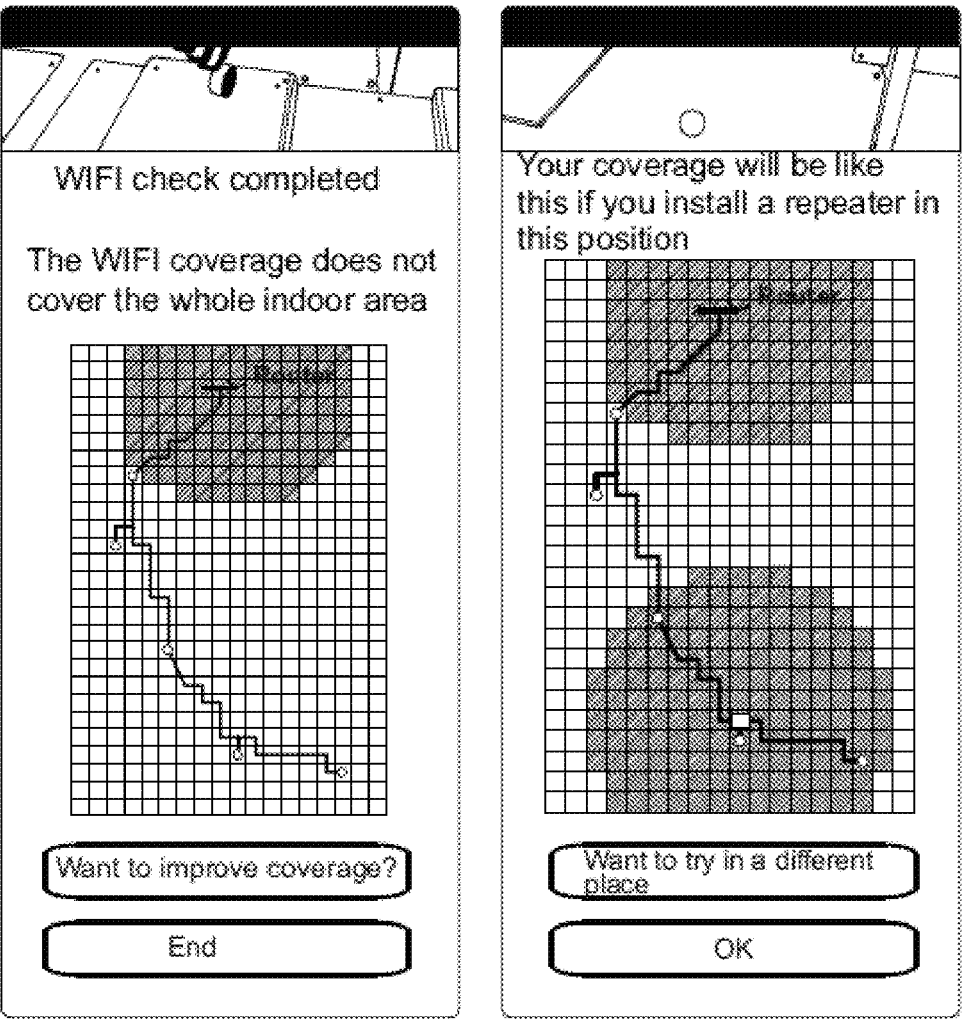
FIG. 5 are two examples of computed coverage maps, with and without repeater.

While walking, the customer 10 can also select to show the wireless coverage map. In such a case, the optimization application computes the wireless coverage map according to the available information. If it is necessary, it also shows the recommendation of a wireless signal repeater in the map. The customer 10 is then invited to walk to the recommended point and build the coverage map with wireless signal repeater. The customer 10 may want to try another point. In such a case, (s)he just needs to walk to the point the rebuild the wireless coverage map with wireless signal repeater in that place (see FIG. 5 for an example). Finally, the customer 10 can finish the entire process.

Figure 4:
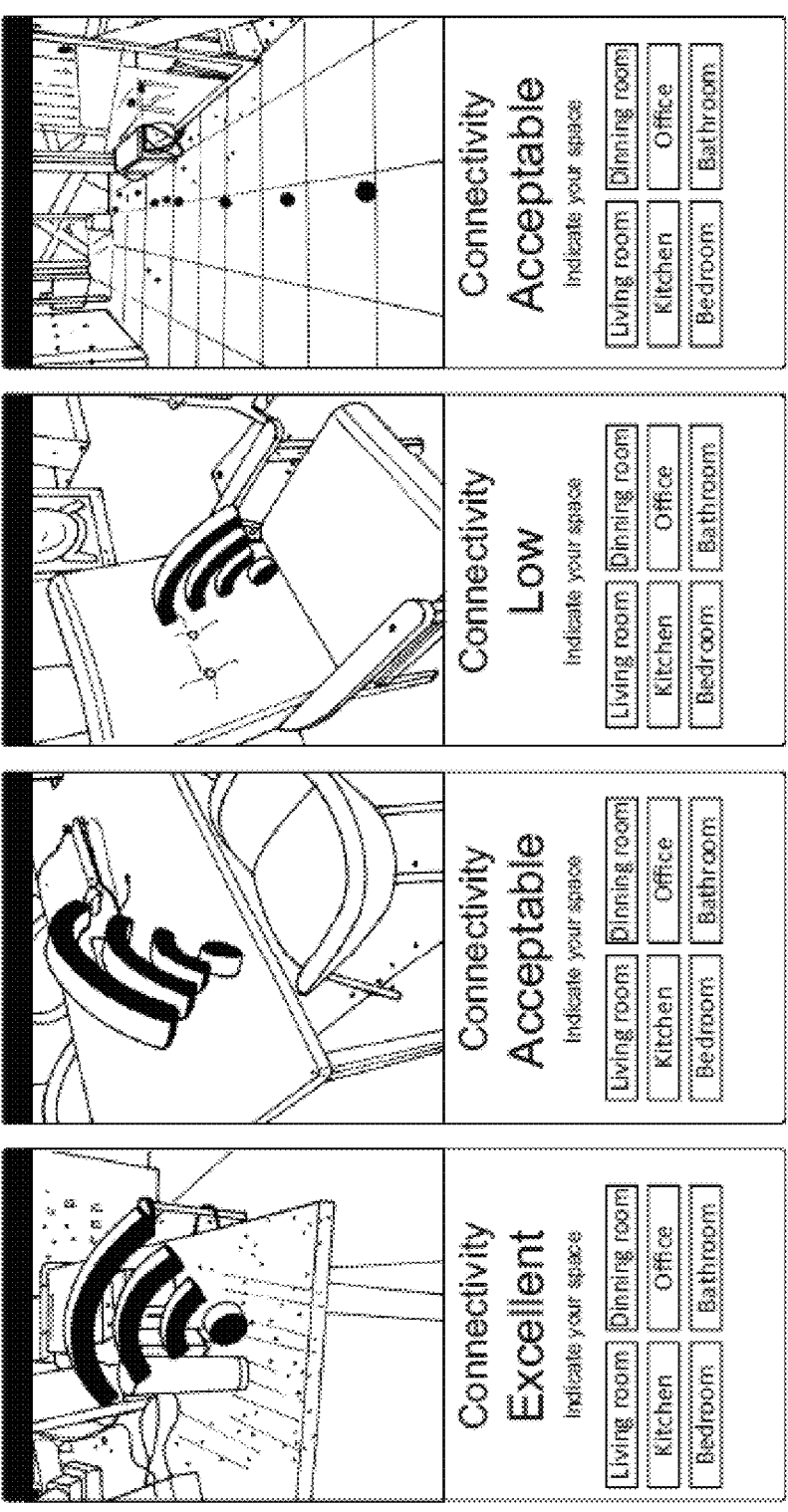
FIG. 4 are some screen designs showing different connectivity representations in the selected interesting points and virtual objects as spheres in AR, according to an embodiment.

During all the process, different AR objects can be represented and showed via the display of the mobile device 40. FIG. 4 shows a particular embodiment in which in each selected interesting point an AR object is placed with different colors to indicate WIFI strength. Virtual objects are represented with different colors and create the path where customer 10 passed through.

Because camera pose from AR framework may not be accurate depending on the customer 10 behavior and environment, in some embodiments, the invention can increase the accuracy by further adding anchor points position estimations to each virtual object. In an embodiment, the invention relies on the fact that the mobile device 40 is kept in same vertical position when moved. This proximation is found to be accurate enough to compute all processes needed.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in software elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real-time network operating systems.

The scope of the present invention is defined in the following set of claims.

The invention claimed is:

1. A method for optimizing indoor wireless coverage, the method comprising:
    connecting, by a mobile device, to a wireless router via a first wireless network, the wireless router being located at a customer premises;
    computing, by the mobile device, a coverage metric for a plurality of subpoints within at least a first point and a second point of the customer premises, obtaining a plurality of coverage metrics as a result, the first point referring to an initial point where the wireless router is located and the second point referring to a point where a customer wants to know if wireless coverage is enough,
    the coverage metrics being computed in real time while the mobile device is moved from the first point to the second point, and
    each coverage metric comprising a position of the mobile device and a quality indicator of the wireless connection of the mobile device in that position, the quality indicator being computed by the wireless router;
    generating, by the mobile device, a wireless coverage map using the plurality of coverage metrics, the generating further comprising improving the generated wireless coverage map by considering the entire customer premises, and the improving comprising:
        computing an averaged quality indicator of the wireless connection of the mobile device for each radial distance of the customer premises;
        computing a linear approximation equation that approximates a quality indicator-distance relationship to a straight line;
        filling gaps of the customer premises in which the mobile device has not been moved by iterating through all the coverages metrics and by computing the quality indicator depending on if there is a quality indicator available or not for each subpoint, wherein if the subpoint comprises a quality indicator a value thereof is filtered using the averaged quality indicator at its radial distance, and wherein if the subpoint comprises no quality indicator a quality indicator is interpolated considering propagation and neighborhood factors; and
        smoothing the coverage map by interpolating each subpoint with the quality indicators of its neighboring subpoints;
    determining, by the mobile device, whether a wireless signal repeater has to be installed based on the generated wireless coverage map; and
    showing, by the mobile device, a new wireless coverage map considering the installation of the wireless signal repeater.

2. The method of claim 1, wherein the determining step comprises establishing that the wireless signal repeater is to be installed, and wherein the mobile device further comprises computing where to place the wireless signal repeater by means of:
    determining which ones of the plurality of subpoints are repeater candidates based on the quality indicator at each subpoint, wherein the subpoint is determined as repeater candidate if its quality indicator is within a minimum and maximum range;
    identifying the determined repeater candidates having a quality indicator lower or equal than a given threshold as bad samples;
    computing a performance parameter for each repeater candidate; and
    selecting the repeater candidate having the lowest performance parameter.

3. The method of claim 1, wherein the wireless router is operatively connected to a cloud computing system via a second wireless network, and wherein the mobile device comprises receiving the computed quality indicator from the wireless router via the cloud computing system.

4. The method of claim 1, wherein the position of the mobile device is computed using an Augmented Reality framework of the mobile device.

5. The method of claim 1, wherein the coverage metrics are computed every 400-600 milliseconds.

6. The method of claim 5, wherein the computing step further comprises establishing an augmented reality virtual path between the first point and the second point by creating virtual objects within said first point and second point and by assigning a color to each created virtual object depending on a level of the quality indicator.

7. The method of claim 1, further comprising providing a name to the second point.

8. A system for optimizing indoor wireless coverage, comprising:

a wireless router located at a customer premises; and a mobile device configured to connect to the wireless router, the mobile device being configured to:

compute a coverage metric for a plurality of subpoints within at least a first point and a second point of the customer premises, obtaining a plurality of coverage metrics as a result, the first point referring to an initial point where the wireless router is located and the second point referring to a point where a customer wants to know if wireless coverage is enough, the coverage metrics being computed in real time while the mobile device is moved from the first point to the second point, and each coverage metric comprising a position of the mobile device and a quality indicator of the wireless connection of the mobile device in that position computed by the wireless router;

generate a wireless coverage map using the plurality of coverage metrics, the generating comprising improving the generated wireless coverage map by considering the entire customer premises, and the improving comprising:

computing an averaged quality indicator of the wireless connection of the mobile device for each radial distance of the customer premises;

computing a linear approximation equation that approximates a quality indicator-distance relationship to a straight line;

filling gaps of the customer premises in which the mobile device has not been moved by iterating through all the coverages metrics and by computing the quality indicator depending on if there is a quality indicator available or not for each subpoint, wherein if the subpoint comprises a quality indicator a value thereof is filtered using the averaged quality indicator at its radial distance, and wherein if the subpoint comprises no quality indicator a quality indicator is interpolated considering propagation and neighborhood factors; and smoothing the coverage map by interpolating each subpoint with the quality indicators of its neighboring subpoints;

determine whether a wireless signal repeater has to be installed based on the generated wireless coverage map; and show a new wireless coverage map considering the installation of the wireless signal repeater.

9. The system of claim 8, further comprising a cloud computing system configured to communicate with the wireless router to receive the computed quality indicators and with the mobile device to forward the received computed quality indicators.

10. A user device comprising one or more processors configured to:

compute a coverage metric for a plurality of subpoints within at least a first point and a second point of a customer premises, obtaining a plurality of coverage metrics as a result, the first point referring to an initial point and the second point referring to a point where a customer wants to know if wireless coverage is enough, the coverage metrics being computed in real time while the user device is moved from the first point to the second point, and each coverage metric comprising a position of the user device and a quality indicator of the wireless connection of the user device in that position;

generate a wireless coverage map using the plurality of coverage metrics, the generating comprising improving the generated wireless coverage map by considering the entire customer premises, and the improving comprising:

computing an averaged quality indicator of the wireless connection of the mobile device for each radial distance of the customer premises;

computing a linear approximation equation that approximates a quality indicator-distance relationship to a straight line;

filling gaps of the customer premises in which the mobile device has not been moved by iterating through all the coverages metrics and by computing the quality indicator depending on if there is a quality indicator available or not for each subpoint, wherein if the subpoint comprises a quality indicator a value thereof is filtered using the averaged quality indicator at its radial distance, and wherein if the subpoint comprises no quality indicator a quality indicator is interpolated considering propagation and neighborhood factors; and smoothing the coverage map by interpolating each subpoint with the quality indicators of its neighboring subpoints;

determine whether a wireless signal repeater has to be installed based on the generated wireless coverage map; and show a new wireless coverage map considering the installation of the wireless signal repeater.

11. The user device of claim 10, wherein:

the position of the user device is computed using an Augmented Reality framework of the user device;

the coverage metrics are computed every 400-600 milliseconds; and the one or more processors are further configured to, in the computing step, establish an augmented reality virtual path between the first point and the second point by creating virtual objects within said first point and second point and by assigning a color to each created virtual object depending on a level of the quality indicator.

12. The user device of claim 10, wherein the one or more processors are further configured to compute where to place the wireless signal repeater by means of:

determining which ones of the plurality of subpoints are repeater candidates based on the quality indicator at each subpoint, wherein a subpoint is determined as repeater candidate if its quality indicator is within a minimum and maximum range;

identifying the determined repeater candidates having a quality indicator lower or equal than a given threshold as bad samples;

computing a performance parameter for each repeater candidate; and selecting the repeater candidate having the lowest performance parameter.

13. A non-transitory computer readable medium comprising code instructions that when executed by at least one processor of a computing device cause the computing device to:

compute a coverage metric for a plurality of subpoints within at least a first point and a second point of a customer premises, obtaining a plurality of coverage metrics as a result, the first point referring to an initial point where a wireless router is located and the second point referring to a point where a customer wants to know if wireless coverage is enough, the coverage metrics being computed in real time while the mobile device is moved from the first point to the second point, and each coverage metric comprising a position of the mobile device and a quality indicator of the wireless connection of the mobile device in that position;

generate a wireless coverage map using the plurality of coverage metrics, the generating comprising improving the generated wireless coverage map by considering the entire customer premises, and the improving comprising:

computing an averaged quality indicator of the wireless connection of the mobile device for each radial distance of the customer premises;

computing a linear approximation equation that approximates a quality indicator-distance relationship to a straight line;

filling gaps of the customer premises in which the mobile device has not been moved by iterating through all the coverages metrics and by computing the quality indicator depending on if there is a quality indicator available or not for each subpoint, wherein if the subpoint comprises a quality indicator a value thereof is filtered using the averaged quality indicator at its radial distance, and wherein if the subpoint comprises no quality indicator a quality indicator is interpolated considering propagation and neighborhood factors; and smoothing the coverage map by interpolating each subpoint with the quality indicators of its neighboring subpoints;

determine whether a wireless signal repeater has to be installed based on the generated wireless coverage map; and show a new wireless coverage map considering the installation of the wireless signal repeater.

\* \* \* \* \*